United States Patent [19]

Murray et al.

[11] Patent Number: 5,316,202
[45] Date of Patent: May 31, 1994

[54] IN-JIG ASSEMBLY BOND FIXTURE FOR MANUFACTURING COMPOSITE COMPONENTS

[75] Inventors: William J. Murray; Mark K. McCullough, both of Albuquerque; Philip D. Brubaker, Tijeras; Paul S. Manicke, Albuquerque, all of N. Mex.

[73] Assignee: General Electric Company, Cincinnati, Ohio

[21] Appl. No.: 960,628

[22] Filed: Oct. 14, 1992

[51] Int. Cl.$^5$ .................. B23K 20/02; B23P 11/00
[52] U.S. Cl. .......................... 228/5.5; 228/9; 228/44.3; 228/49.1; 269/37; 269/311; 29/889.21
[58] Field of Search .......... 228/44.3, 47, 49.1, 228/212, 242, 178, 5.5, 9, 106; 269/37, 311; 29/889.21

[56] References Cited

U.S. PATENT DOCUMENTS

| 3,056,369 | 10/1962 | Roth | 228/212 |
|---|---|---|---|
| 3,399,443 | 9/1968 | Roy et al. | 29/889.21 |
| 4,004,725 | 1/1977 | Stoner | 228/49.1 |
| 4,009,874 | 3/1977 | Hughey | 269/909 |
| 5,020,716 | 6/1991 | Miller et al. | 228/212 |

Primary Examiner—Samuel M. Heinrich
Attorney, Agent, or Firm—Charles L. Moore, Jr.; Jerome C. Squillaro

[57] ABSTRACT

An in-jig assembly bond fixture for manufacturing a composite component having a plurality of parts includes at least one fixture for holding each of the plurality of parts in proper alignment relative to one another during a bonding operation. A mechanical mechanism is provided integral with the at least one fixture for applying a predetermined uniform compressive force to each bond line between each of the plurality of parts during the bonding operation. A plurality of heating elements is provided for applying heat directly to each bond joint and are each selectively located within the fixture for applying heat uniformly across each bond line during the bonding operation.

19 Claims, 8 Drawing Sheets

IN-JIG ASSEMBLY BOND FIXTURE FOR MANUFACTURING COMPOSITE COMPONENTS

The government has rights in this invention pursuant to Contract No. F33615-85-C-5014 awarded by the Department of the Air Force.

BACKGROUND OF THE INVENTION

The present invention relates to the manufacturing of components made from composite materials, and more particularly, to an in-jig assembly bond fixture for manufacturing composite components having multiple sub-components, such as a composite gas turbine engine component or the like.

Figure 1:
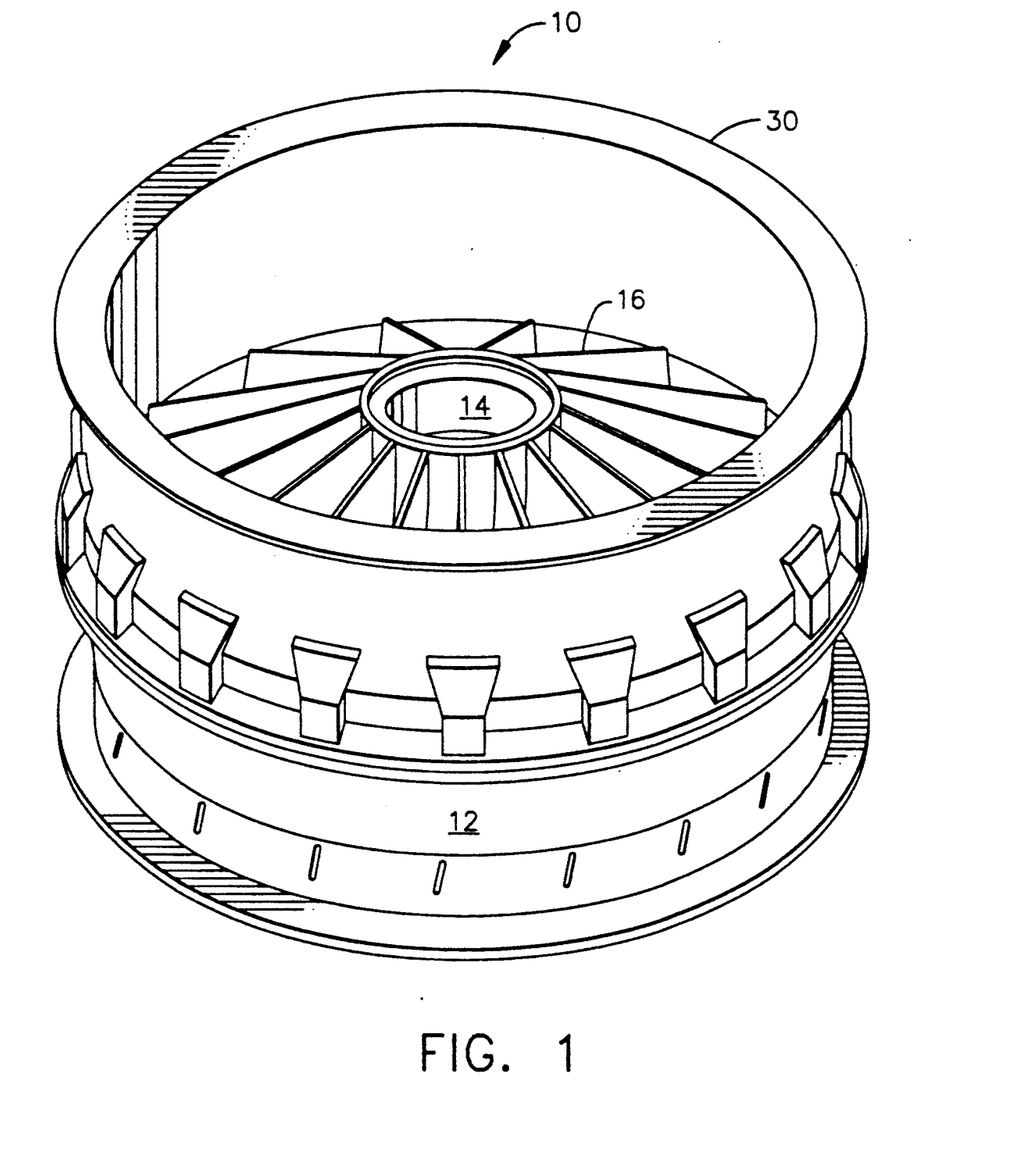
FIG. 1 is a perspective view of a front frame assembly of a gas turbine engine.
Figure 2:
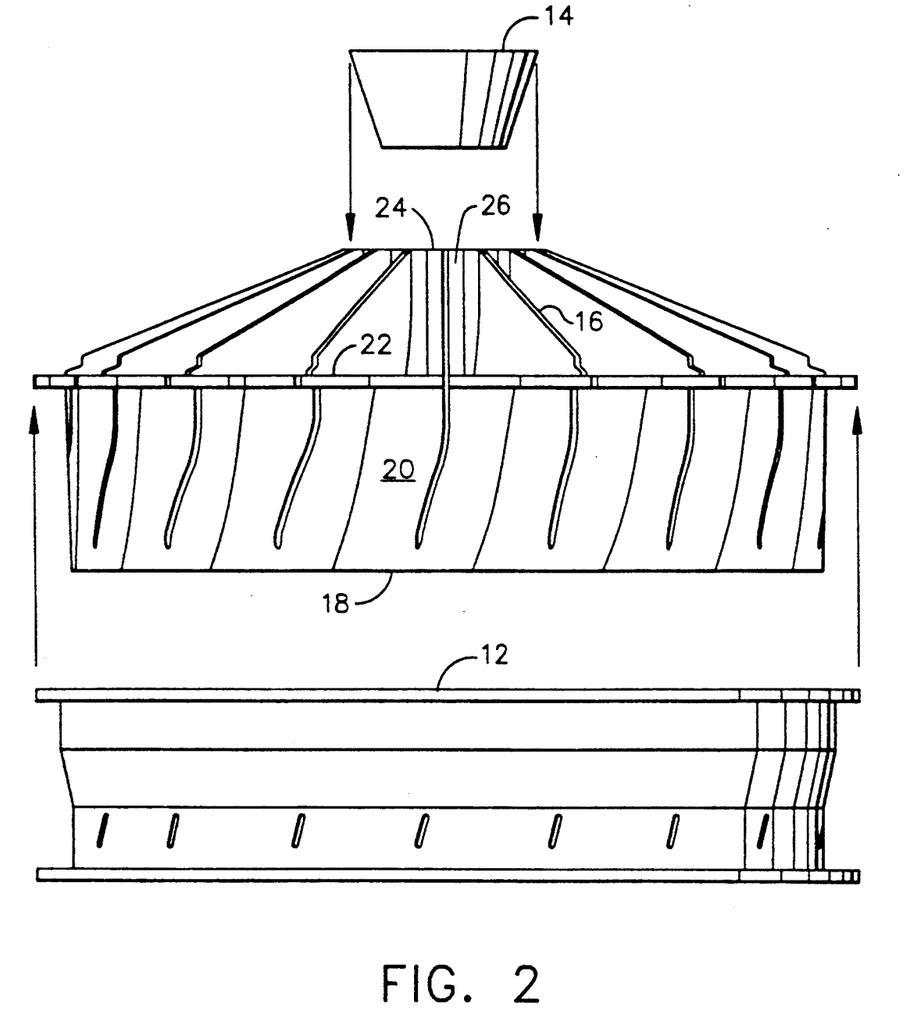
FIG. 2 is a side elevation exploded view of a portion of the front frame assembly of FIG. 1.
Figure 3:
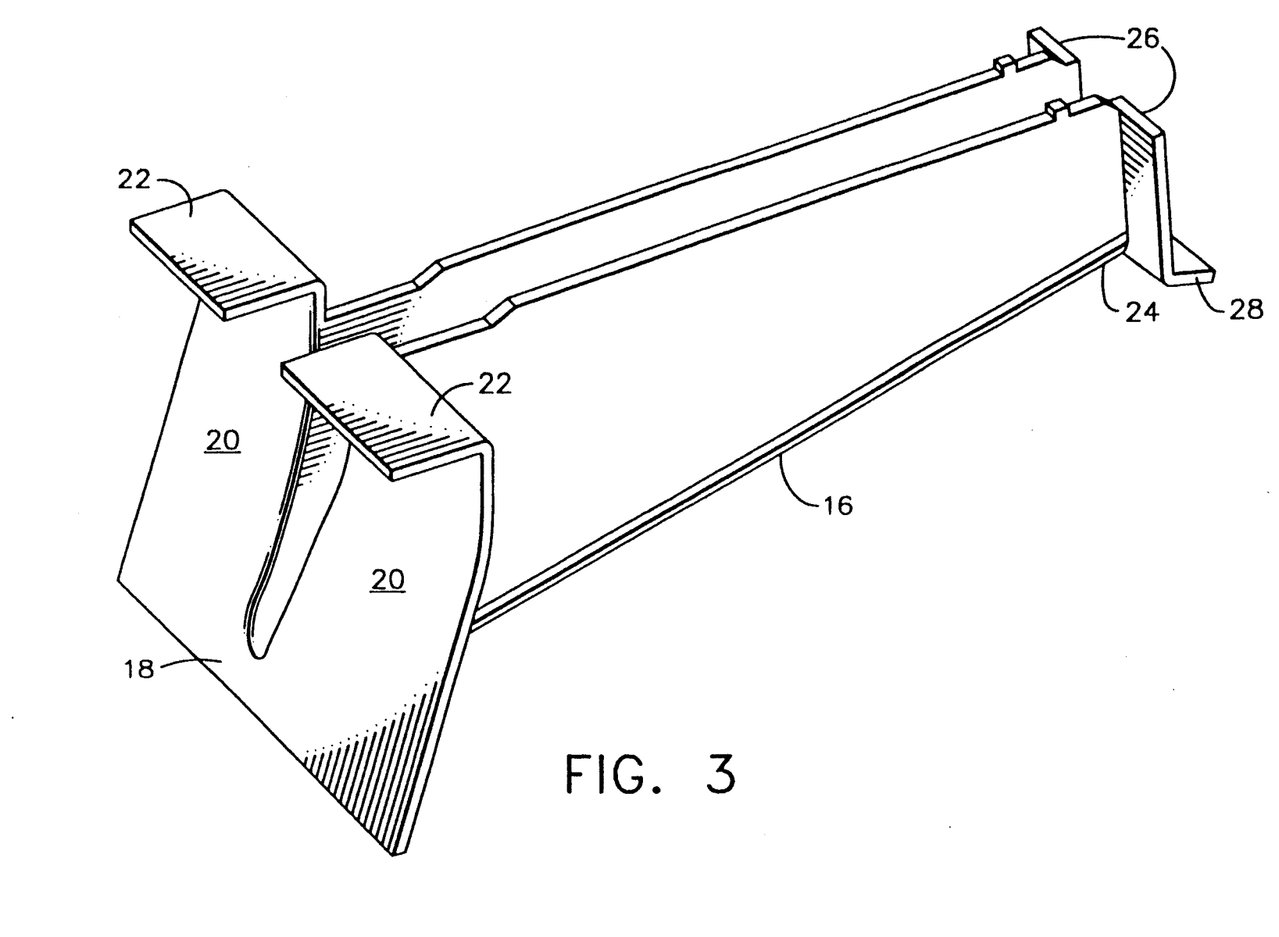
FIG. 3 is a perspective view of a strut of the front frame assembly of FIG. 1.

Composite materials are gaining wider application and use as a material for aerospace applications and the like, and in particular the manufacturing of gas turbine engine components, such as those used in high performance engines for aircraft propulsion, because of the light weight and high strength of these composite components. Such aircraft engine components may include an engine front frame, a fan stator assembly or an airfoil type engine assembly. An example of a composite gas turbine engine component is the front frame engine assembly 10 shown in FIG. 1. Referring also to FIGS. 2 and 3, the front frame assembly 10 includes an annular outer forward case 12, an inner hub 14 and a plurality of intermediate radially extending strut members 16 which are attached between the annular case 12 and the inner hub 14. As best shown in FIG. 3, strut 16 includes an outer end 18 having outer strut feet 20, which extend substantially perpendicular to the longitudinal extent of strut 16, and radially extending flanges 22 extending substantially perpendicular from strut feet 20. Both strut feet 20 and flanges 22 are attached or bonded to case 12 during manufacturing. Strut 16 further includes an inner end 24 having inner strut feet 26 extending substantially perpendicular to the longitudinal extent of strut 16 and radial flange 28 extending substantially perpendicular from inner strut feet 26. Inner strut feet 26 and flange 28 are attached or bonded to inner hub 14 during manufacturing. An aft annular casing 30 is bonded to forward casing 12 as shown in FIG. 1 after assembly of the forward case.

The frame, therefore, represents a very complex assembly of sub-components which must be bonded together using high temperature adhesives. The assembly of these different components into the frame 10 represents a formidable manufacturing challenge. The bonded joints must be maintained at a specific bond line thickness to ensure strength while the adjacent constituents are held accurately in place during the curing cycle. Because of tight tolerances, positioning of the components is very critical and must be accurately controlled to ensure proper airfoil orientation and the proper air flow path through the engine during operation of the assembled engine.

A prior art arrangement for retaining the different components in proper alignment during a curing cycle in an oven utilized C-clamps, jack screws and paste adhesive. The different constituents were prepared with the paste adhesive and oriented relative to one another and secured in position by tightening the hand jack screws, C-clamps or toggle clamps. This arrangement and method provided no control or reliability as to the integrity of the finished assembly. This oven fixture provided no internal heating or uniform pressure on the different bond joints during the curing cycle to ensure a specific bond line thickness and that the different constituents remained in their proper orientation relative to one another. Additionally, this fixture had no internal monitoring to verify or control that the proper amounts of heat and pressure were being applied to each respective bond joint. The pressure applied was merely as a result of the clamping mechanics of the jack screws, C-clamps or toggle clamps and maintenance of a constant uniform pressure was suspect during a curing cycle because of the susceptibility of these different clamps to thermal growth and distortion caused by the heat of the curing oven. The temperature of the oven could be controlled by a thermocouple; however, there was no actual monitoring and control of the bond temperatures at the individual joints of the assembly or monitoring and control of the bonding at critical bonding surfaces.

Thus, there was a need for a new in-jig assembly bond fixture which was a self-contained, stand-alone, integrally heated and pressurized unit including a computer controlled/integrated system for monitoring and controlling the bonding operation at the different bond joints and at critical bonding surfaces.

SUMMARY OF THE INVENTION

It is, accordingly, a primary object of the present invention to provide a novel assembly bond fixture which is not subject to the foregoing disadvantages.

It is another object of the present invention to provide a novel assembly bond fixture which is a self-contained, stand-alone, integrally heated and pressurized unit including an integrated computer control system for monitoring and controlling the bonding operation.

It is a further object of the present invention to provide a novel assembly bond fixture which is not susceptible to thermal growth and distortion during the heat bonding cycle.

It is yet a further object of the present invention to provide a novel assembly bond fixture which provides reliable and consistent assembly of a component.

In accordance with the present invention, an in-jig assembly bond fixture for manufacturing a composite component having a plurality of parts includes at least one fixture for holding each of the plurality of parts in proper alignment relative to one another during a bonding operation. A mechanical mechanism is provided integral with the at least one fixture for applying a predetermined uniform compressive force to each bond line between each of the plurality of parts during the bonding operation. A plurality of heating elements is provided for applying heat energy directly to each bond joint and are each selectively located within the fixture for applying heat uniformly across each bond line during the bonding operation. A controller may be provided for monitoring and controlling the uniform compressive force applied to each of the bonding joints and means may also be provided for monitoring and controlling the heat applied to each of the bonding joints.

These and other objects of the present invention, together with the features and advantages thereof, will become apparent from the following specification when read with the accompanying drawings in which like reference numerals refer to like elements.

DETAILED DESCRIPTION OF THE PREFERRED EMBODIMENTS

Figure 4:
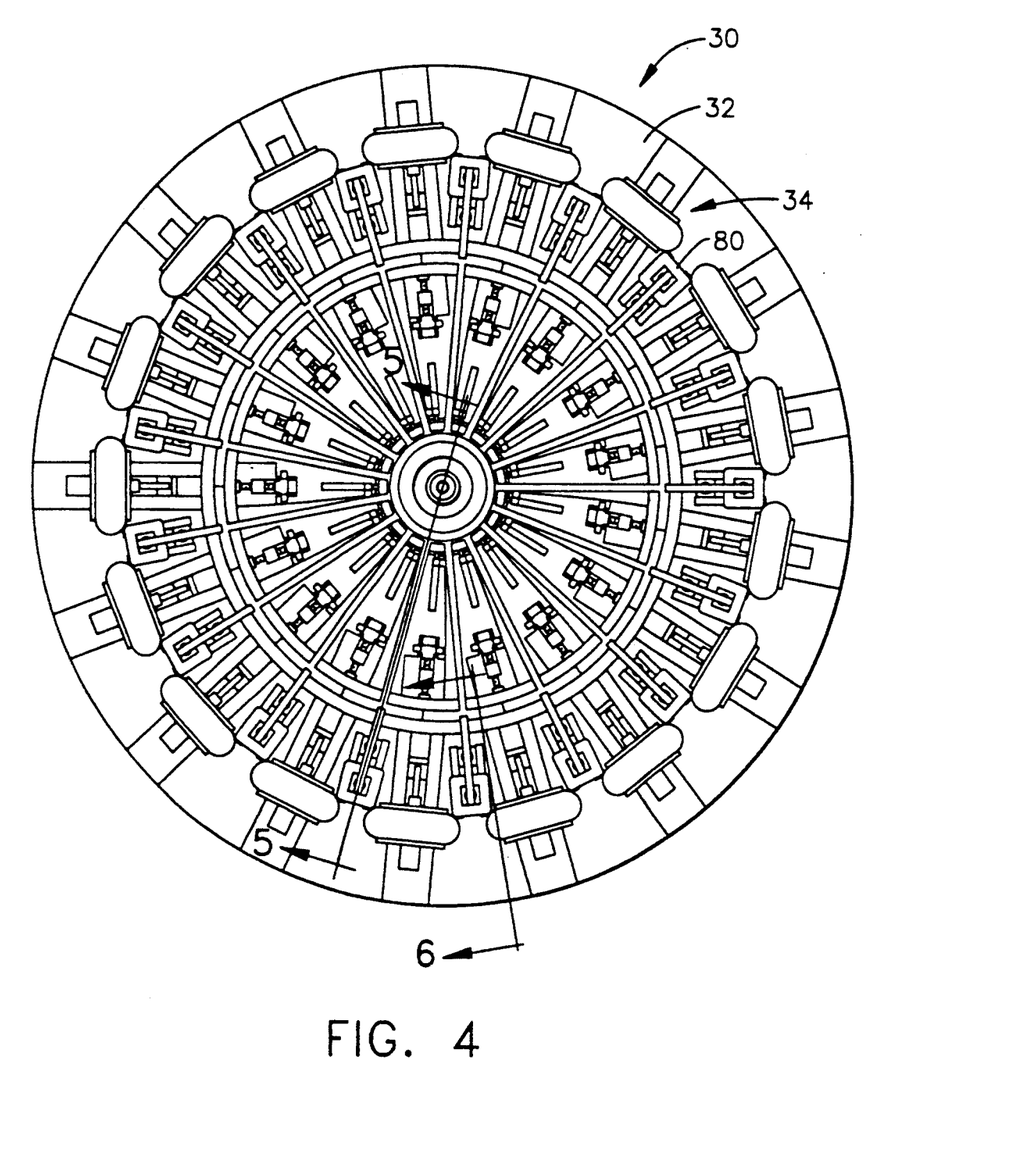
FIG. 4 is a top elevation view of the in-jig assembly bond fixture in accordance with the present invention.
Figure 4A:
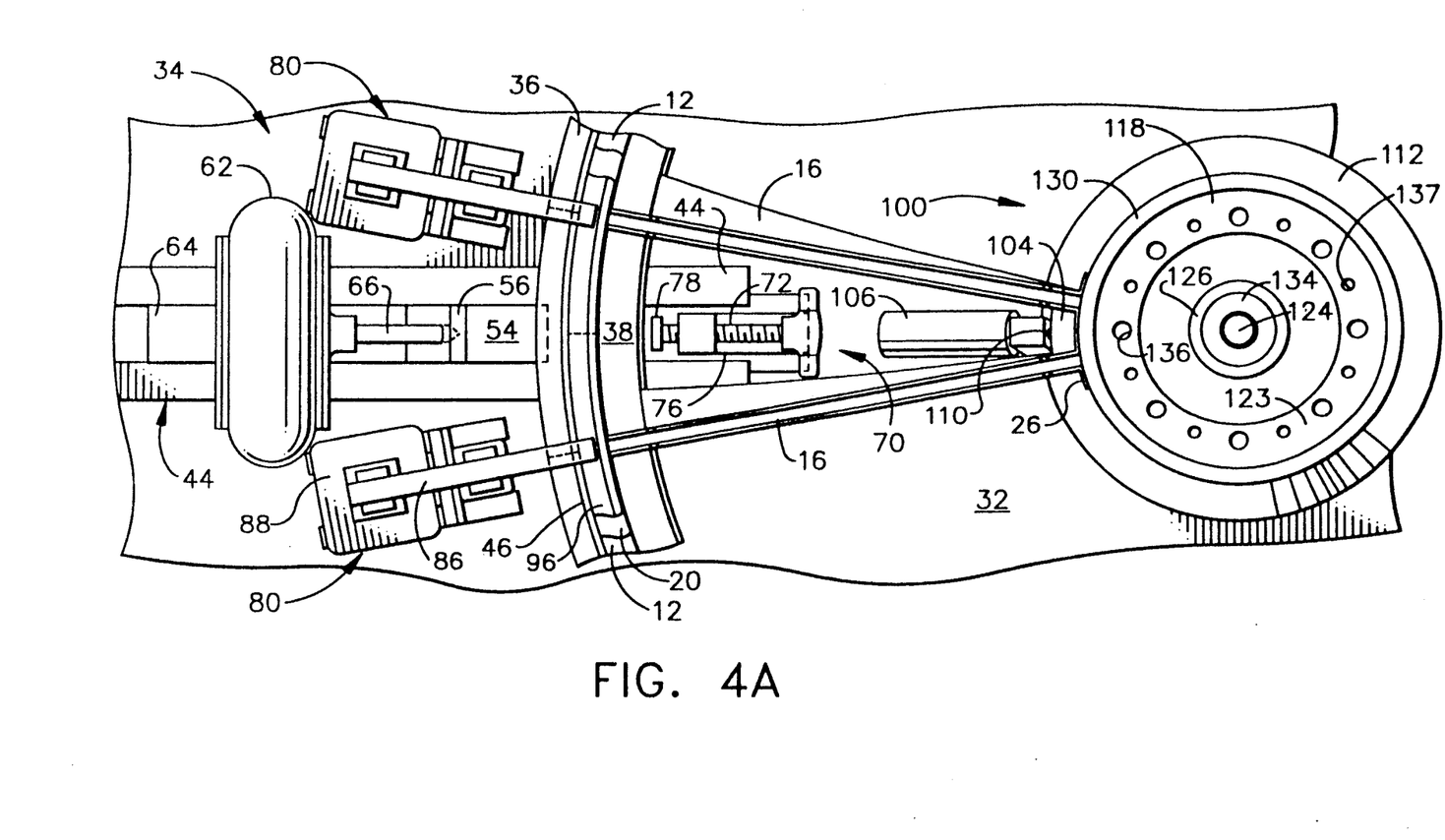
FIG. 4A is a detailed partial top elevation view of the in-jig assembly bond fixture of FIG. 4.
Figure 5:
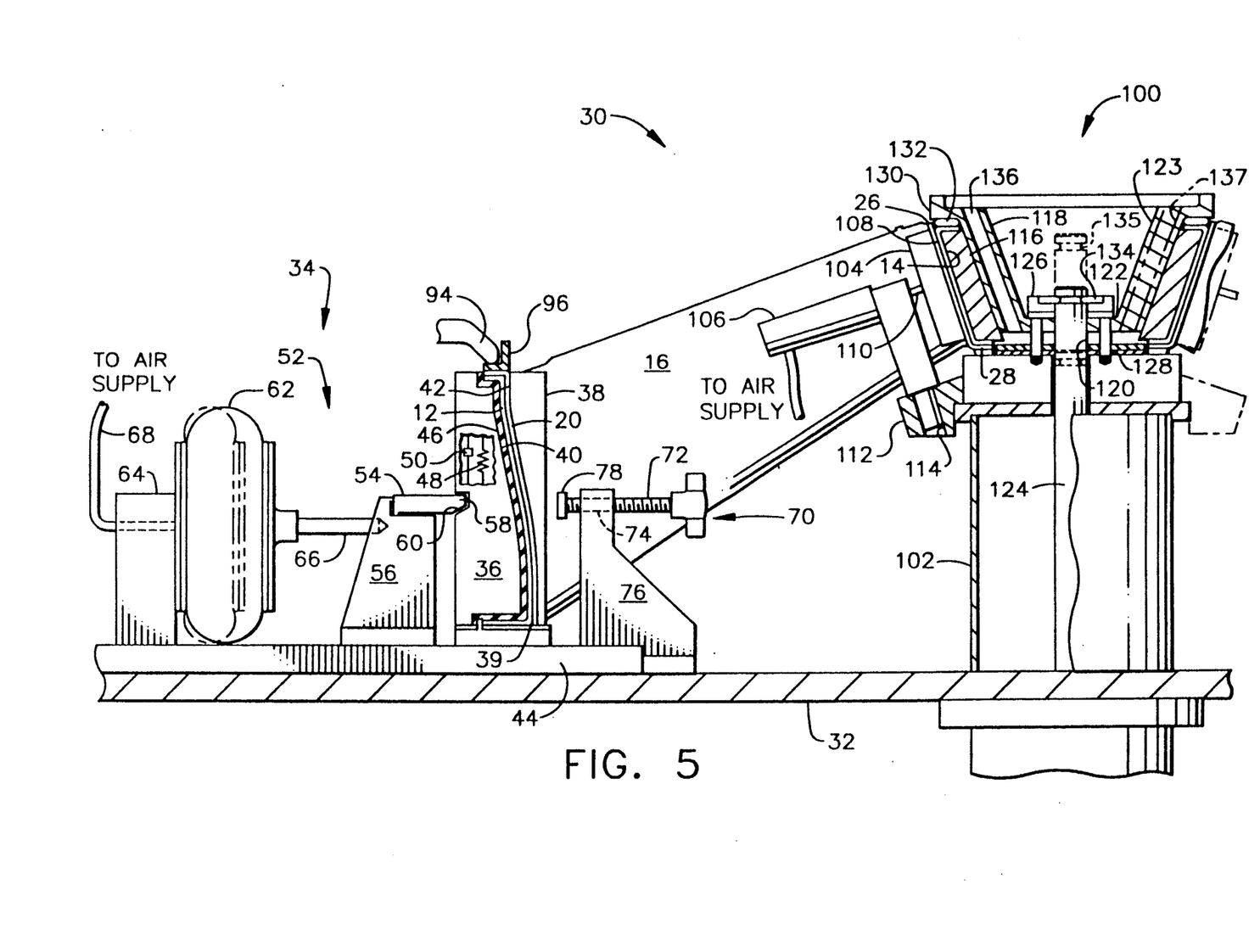
FIG. 5 is a detailed partial cross-sectional view of the in-jig assembly bond fixture of FIG. 4 taken along line 5—5.

Referring initially to FIGS. 4, 4A and 5, an in-jig assembly bond fixture, indicated generally as 30, includes a base member 32 and a plurality of outer fixture means 34 for holding the annular forward case 12 of a gas turbine engine front frame assembly 10 (FIG. 1) and each of the struts 16 in proper position relative to one another to bond each of the struts 16 to the annular forward case 12. As best shown in FIGS. 4A and 5, each of the plurality of outer fixture means 34 includes an arcuate pressure plate or block 36 for abutting an outer surface of the annular forward case 12 of the frame assembly 10 and an arcuate backstop plate 38 for abutting and retaining a juxtaposed pair of outer strut feet 20 of two adjacent struts 16 during a bonding operation. As will be described in more detail hereinafter, the pressure plate 36 and the backstop plate 38 operate in cooperation with one another to apply a predetermined uniform compressive force to the joint 39 between the annular forward case 12 and the outer strut feet 20 during a bonding operation. The pressure plate 36 preferably has an operating face 40 which is shaped to conform to an outer surface of the annular case 12, and backstop plate 38 preferably has an operating face 42 which is shaped to conform to the shape of the outer strut feet 20. Pressure plate 36 is preferably slidably mounted to base member 32 by a slide channel 44 which is fixedly attached to base member 32. Slide channel 44 permits pressure plate 36 to slide back and forth between a non-operating position at a spacing from backstop plate 38 to permit insertion of the forward case 12 and struts 16 into the assembly bond fixture 30 and to permit removal of the frame assembly 10 after the bonding operation, and an operating position with the operating face 40 of the pressure plate 36 and the operating face 42 of the backstop plate 38 applying the predetermined uniform compressive force directly to the joint 39 between the annular case 12 and the outer strut feet 20 during a bonding operation.

A pressure layer 46 of a high heat resistant conformable material, such as RTV rubber or the like, may be disposed between the operating face 40 of pressure plate 36 and the annular case 12 to facilitate conformance between the pressure plate operating face 40 and the outer surface of the casing 12 and to provide uniform pressure across the operating face 40 when pressure plate 36 is in its operating position.

The pressure plate 36 and backstop plate 38 each have a plurality of electrical resistive heating elements 48 (shown schematically in FIG. 5) mounted at selected locations within the plates 36 and 38 to provide a desired uniform distribution of heat energy directly to the joint 39 or bond line to properly bond the annular case 12 to the strut member 16. The pressure plate 36 and backstop plate 38 also include a plurality of thermocouples 50( shown schematically in FIG. 5) which are mounted at selected locations to provide monitoring and control of the heating of the plates 36 and 38 during a bonding operation.

Each of the plurality of outer fixture means 34 further include an actuator arrangement 52 for forcing the pressure plate 36 against the annular case 12 to provide the predetermined uniform compressive force on the joint 39 between the case 12 and the outer strut feet 20 during the bonding operating. The actuator arrangement 52 includes a pusher bar 54 which is pivotably mounted to a first support member 56. The pusher bar 54 may be held in position on first support member 56 by a suitable fastener (not shown) which permits limited vertical pivotal movement of the pusher bar 54. First support member 56 is slidably mounted in slide channel 44 for movement of the pusher bar 54 between a non-operating position and an operating position for applying the predetermined compressive force. The pusher bar 54 has an operating end 58 which is shaped for matingly engaging a groove or notch 60 formed in the pressure plate 36 to cause the pressure plate 36 to move into its operating position to provide the compressive force during a bonding operation. An expandable air bladder 62 is mounted by a second support member 64 to slide channel 44. The air bladder 62 has an actuator pin 66 mounted at one end of the air bladder opposite to the support member 64 and actuator pin 66 has an opposite end for engaging and sliding the first support member 56 into its operating position when the air bladder 62 is expanded to provide a controllable force during a bonding operation. Second support member 64 is slidably positionable on base member 32 within slide channel 44 and may be removably affixed at selected locations to accommodate different sizes of annular cases 12 or other components for assembly. Air bladder 62 is coupled by support member 64 and tubing 68 to a suitable air supply (not shown) for actuating the air bladder 62.

Each of the outer bonding fixture means 34 further includes an adjustment mechanism 70 for adjusting and fixing the position of the backstop plate 38. Adjustment mechanism 70 includes a thumbscrew 72 threadedly received in a bore 74 formed in a support pedestal 76 which is attached to base member 32 by channel 44. Thumbscrew 72 has an adjustment point 78 pivotably mounted at one end thereof for engaging backstop plate 38 when thumbscrew 72 is advanced. Support pedestal 76 may be fixed in position within channel 44 by a suitable set screw arrangement (not shown) or the like.

In operation, expandable air bladder 62 is actuated by the air supply to push actuator pin 66 against support member 56 with a predetermined force. Support member 56 is urged forward and push bar 54 engages the notch 60 in pressure plate 36 to urge pressure plate 36 forward. Backstop plate 38 is held in place by adjustment mechanism 70 and the pressure supplied by actuated air bladder 62 causes uniform pressure across the operating faces 40 and 42 of pressure plate 36 and backstop plate 38, respectively, to provide a predetermined uniform compressive force at the joint 39 between annular case 12 and the outer strut feet 20 of strut 16. The compressive force may be monitored and controlled by in-line measurement of the air pressure from the air supply or by strain gauges mounted on the pressure plate 36 and backstop plate 38.

Figure 6:
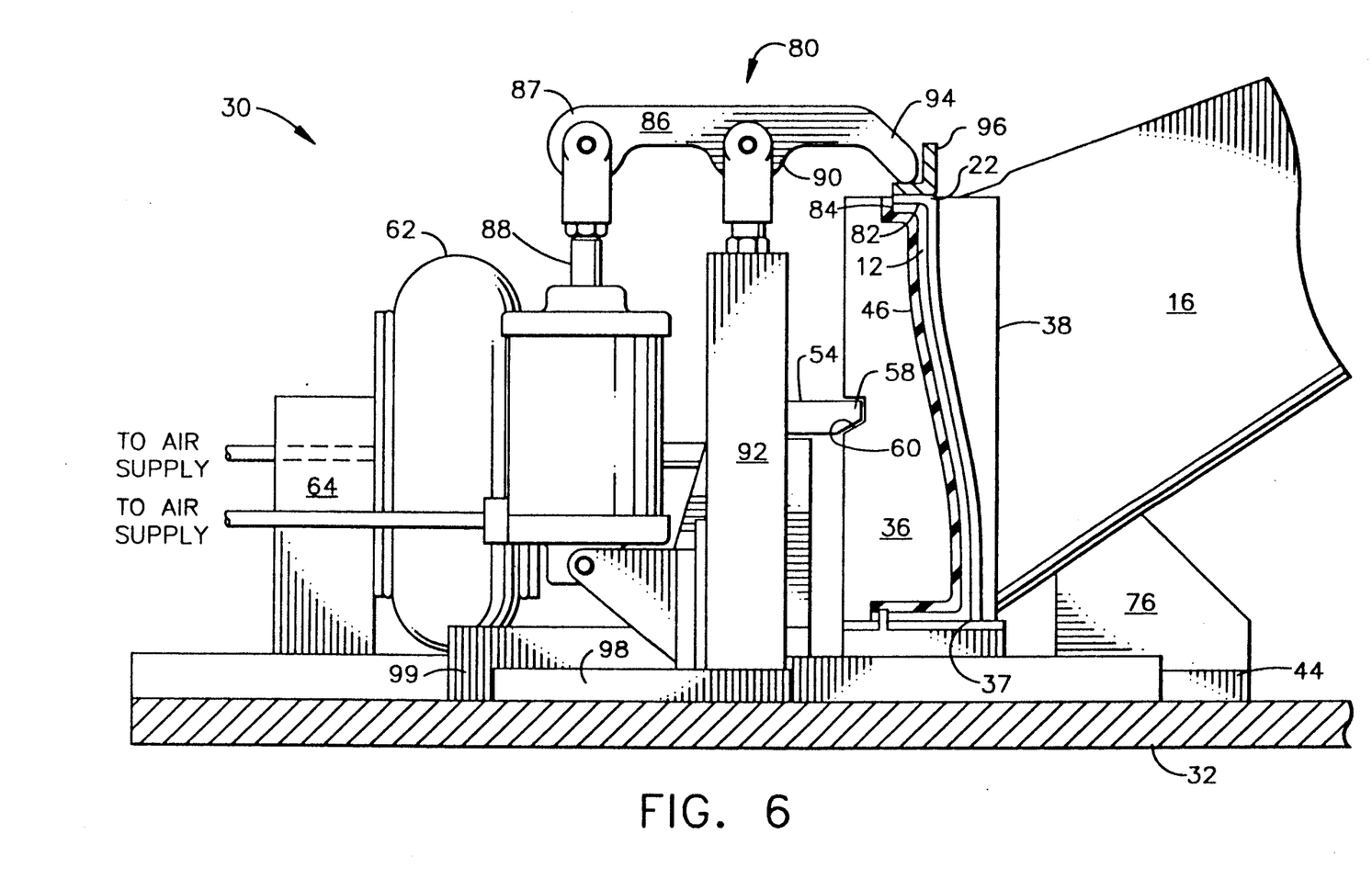
FIG. 6 is a detailed cross-sectional view of the in-jig assembly bond fixture of FIG. 4 taken along lines 6—6.

Referring to FIGS. 4, 4A and 6, in accordance with the present invention, the assembly bond fixture 30 of the present invention further includes a plurality of biasing mechanisms 80, one disposed between each pair of juxtaposed outer fixture means 34, as best shown in FIG. 4, for applying a predetermined compressive force to a joint 82 between each of the outer end radial flanges 22 of each strut 16 and a radially extending flange 84 of the annular case 12. Each of the biasing mechanisms 80 includes an actuator bar 86 which is pivotably mounted at one end 87 to a pneumatically operated piston 88 and is pivotably mounted at an intermediate location 90 to a support stanchion 92. The actuator bar 86 has an operating end 94 opposite to the one end 87 which is shaped to engage an annular ring 96 which is positioned over each of the joints 82 to provide a uniform pressure across substantially the entire bond line of each of the joints 82. The pneumatic piston 88 and the stanchion 92 are mounted to a base support member 98 which in turn may be removably mounted to base member 32 by sliding into a restraining toe clamp 99 positioned at the appropriate location on base member 32, depending upon the size and shape of the component being manufactured, for applying the compressive force to the different joints 82 during a bonding operation.

In operation, pneumatic piston 88 is actuated by the air supply to force end 87 of actuator bar 86 to pivot about intermediate point 90 and to apply a downward force on annular ring 96. Because the case member 12 and the strut member 16 are secured between pressure plate 36 and backstop plate 38, the force applied by actuator bar 86 creates another predetermined uniform compressive force at joint 82.

Referring back to FIG. 5, the in-jig assembly bond fixture 30 of the present invention further includes a center fixture arrangement 100 which is mounted to the base member 32 for holding the inner strut feet 26 and radial flange 28 of the inner end 24 of strut 16 (FIG. 3) in proper position relative to inner hub 14 (FIG. 2) during a bonding operation. Center fixture arrangement 100 is mounted on a pedestal 102 to provide proper alignment between annular casing 12, strut 16 and hub 14 during the bonding operation. The height of pedestal 102 may be adjusted for bonding different gas turbine engine components such as a fan stator or other airfoil engine assemblies. Center fixture arrangement 100 includes a plurality of hub pressure plates 104 which are substantially evenly spaced circumferentially about the hub 14, one each between juxtaposed struts 16 as best shown in FIGS. 4 and 4A (reference numerals for pressure plates 104 are not shown in FIG. 4 for purposes of clarity). A plurality of pneumatically operated cylinders 106 is provided in association with each hub pressure plate 104 to provide a predetermined uniform compressive force at the joint or bond line 108 between the hub 14 and the inner strut feet 26 and flange 28 of strut 16. The pneumatically operated cylinders 106 each include a piston 110 for engaging the hub pressure plate 104. The pneumatically operated cylinders 106 are mounted to the center fixture pedestal 102 by an annular bracket 112 having a plurality of channels 114 formed therein for mounting each of the pneumatic cylinders 106 in proper orientation for applying the predetermined force to pressure plates 104.

A segmented flange adapter cone 116 is inserted within hub 14 to facilitate application of the compressive force at the bond line 108 between the hub 14 and the inner strut feet 26 and flange 28. The flange adapter cone 116 is segmented into a plurality of parts to facilitate insertion into hub 14 and removal from the hub 14 after a bonding operation. A cup-shaped pressure plate 118 is disposed over the segmented flange adapter cone 116. The cup-shaped pressure plate 118 has a flat bottom portion 122 and an annular side portion 123 which extends from the bottom portion 122 at a selected angle relative to the surface normal of bottom portion 122 to mate with the segmented flange adapter cone 116 and to apply the compressive force at joint 108 during a bonding operation. The cup-shaped pressure plate 118 has a passage 120 formed substantially in the center of the bottom portion 122 through which is inserted a pneumatically operated actuator rod 124. An alignment disk 126 is attached to actuator rod 124 which applies a downward force to the bottom portion 122 of cup-shaped pressure plate 118 when pneumatically operated actuator rod 124 is pulled down into an operating position. Actuator rod 124 may be operated by an air cylinder (not shown) or similar pneumatic device known to those skilled in the art. Alignment disk 126 may have a plurality of alignment pins 128 extending downwardly therefrom for receipt by alignment channels formed in the bottom portion 122 of cup-shaped pressure plate 118 to provide proper alignment of the cup-shaped pressure plate 118 relative to the hub 14 during a bonding operation. The cup-shaped pressure plate 118 has an annular radially extending flange 130 which extends radially outwardly over hub 14 and segmented flange adapter cone 116 to provide a downward force on the joints between hub 14 and segmented adapter cone 116 and the joints between the inner strut feet 26 and flanges 28 and the hub 14 when actuator rod 124 is pulled into its operating or compression position. An annular washer 132 may be disposed between radially extending flange 130 and hub 14 to facilitate application of a uniform force for bonding joint 108 between hub 14 and inner strut feet 26 and flanges 28.

Alignment disk 126 is preferably removably attached to actuator rod 124 by a clip spring 134 or similar mechanism which is fastenable about an annular groove 135 formed in rod 124. Alignment disk 126 is removable to permit removal of cup-shaped pressure plate 118 during insertion and alignment of strut 16, hub 14 and segmented flange adapter cone 116 before a bonding operation and to facilitate removal of the bonded assembly from the bond fixture 30 after the bonding operation.

Cup-shaped pressure plate 118 has a plurality of receptacles 136 formed therein at predetermined locations for receipt of electrical resistive heating elements (not shown), such as calrod type heaters or the like, to supply a uniform distribution of heat across the bond lines or joints between the strut 16 and hub 14. Cup-shaped pressure plate 118 further includes other receptacles 137 (shown in phantom in FIG. 5) for receiving thermocouples for monitoring and controlling the heating of the bond joints.

In operation, actuator rod 124 and alignment disk 126 in cooperation with cup-shaped pressure plate 118 provide downward and lateral pressure on the joint 108 and hub pressure plate 104 provides opposite upward and lateral forces to provide, in conjunction with pressure plate 118, a predetermined uniform compressive force on bond joint 108. This compressive force may be monitored and controlled by monitoring the air pressure operating pneumatic cylinder 106 and pneumatic actuator rod 124 as described in more detail hereinafter.

It should be noted that a high strength adhesive tape is attached to at least one surface of each joint or bond line as the different constituents of the frame assembly 10 are inserted into the assembly bond fixture, 30 prior to application of the compressive forces and heat during the bonding operation or cycle.

Figure 7:
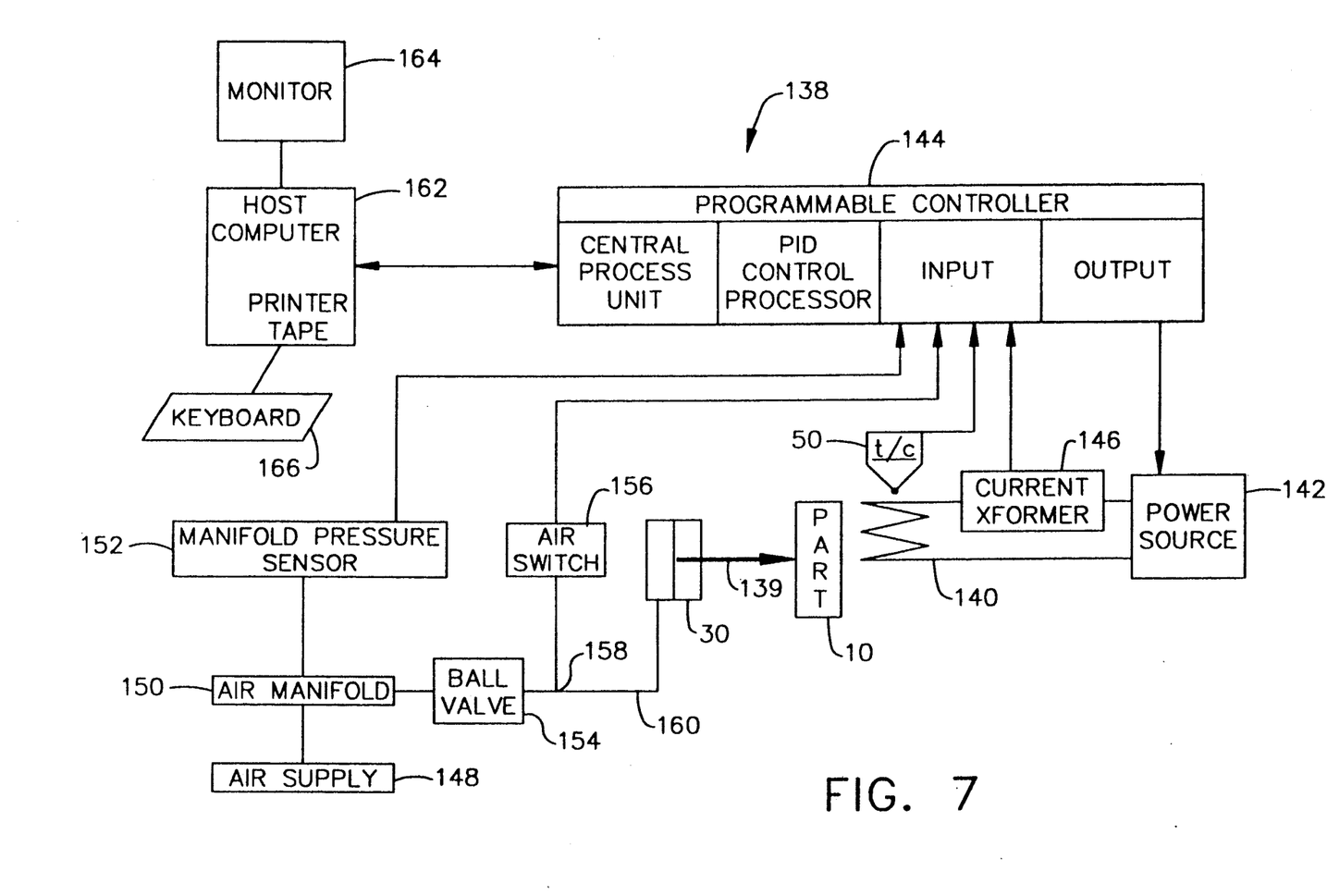
FIG. 7 is a schematic view of the monitoring and control system of the in-jig assembly bond fixture in accordance with the present invention.

In accordance with the present invention, a monitoring and control system 138 for the bonding cycle or operation is shown schematically in FIG. 7. The in-jig assembly bond fixture is represented schematically by block 30 and each of the predetermined uniform compressive forces applied at each of the plurality of outer fixture means 34 and at the center fixture arrangement 100 are illustrated by arrow 139. The resistive heating elements 48 in pressure plates 36 and 38 and in cup-shaped pressure plate 118 are illustrated schematically by resistor symbol 140. The heating elements 140 are connected to a power source 142. In accordance with the present invention, a programmable controller 144 is provided to monitor and control the application of the uniform compressive forces 139 and the application of heat to the different bond lines or joints. A current transformer 146 is connected in series between power source 142 and resistive heating elements 140 to provide a control input to programmable controller 144 for monitoring and controlling the application of heat to each of the bond lines or joints. As previously discussed, thermocouples 50 are collocated with resistive heating elements 140 at predetermined locations within the outer fixture means pressure plates 36 and 38 and hub pressure plates 104 and cup-shaped pressure plate 118 of center fixture arrangement 100. The thermocouples are each coupled to programmable controller 144 to provide additional monitoring and control of the application of heat to the different bond lines or joints.

In accordance with the present invention, an air supply 148 is provided for actuation of expandable air bladder 62, air cylinder 106 and pneumatic actuation rod 124. Air supply 148 is connected to an air manifold 150 for distribution of working air to each of the actuation means. A manifold pressure sensor 152 is coupled to air manifold 150 for sensing the pressure in the manifold and the pressure sensor 152 is in turn coupled to programmable controller 144 to provide monitoring and control of the application of the compressive forces at each of the fixture means 34 and 100. A plurality of ball valves 154 are provided to control the application of air to each of the force application means or actuator means, i.e., air bladder 62, air cylinder 106 and actuation rod 124. An air switch 156 is connected to a tap 158 in the output conduit 160 of each ball valve 154 to provide a further input to programmable controller 144 for monitoring the application of the uniform compressive forces at each of the fixture means or arrangements 34 and 100.

Programmable controller 144 may be coupled to a host computer 162 for storing process parameters for in-process, real time monitoring and control of the bonding operation and for later evaluation as to the performance of the bonding operation. A monitor 164 and keyboard 166 may be provided and coupled to host computer 162 to facilitate monitoring of the bond cycle process parameters and permit operator adjustment of the process parameters on a real time basis. Host computer 162 may also store historical and statistical data to permit tracking of the bonding cycles for different components.

While the present invention has been described with respect to the assembly and bonding of a composite front frame of a gas turbine engine, those skilled in the art will recognize that the present invention is also applicable to the manufacturing of any type composite component and that the present invention is not limited to the specific embodiments described and illustrated herein. Different embodiments and adaptations besides those shown herein and described as well as many variations, modifications and equivalent arrangements will now be apparent or will be reasonably suggested by the foregoing specification and drawings, without departing from the substance or scope of the invention. While the present invention has been described herein in detail in relation to its preferred embodiments, it is to be understood that this disclosure is only illustrative and exemplary of the present invention and is merely for purposes of providing a full and enabling disclosure of the invention. Accordingly, it is intended that the invention be limited only by the spirit and scope of the claims appended hereto.

What is claimed is:

1. An in-jig assembly bond fixture for manufacturing a composite component having a plurality of parts, comprising:
  at least one fixture for holding each of said plurality of parts in proper alignment relative to one another during a bonding operation;
  means integral with said at least one fixture for applying a predetermined uniform compressive force to each bond line between each of said plurality of parts during the bonding operation; and
  a plurality of heating elements selectively located within said fixture for applying heat uniformly across each bond line during the bonding operation.

2. The bond fixture of claim 1, further comprising means for monitoring and controlling the uniform compressive force during the bonding operation.

3. The bond fixture of claim 1, further comprising means for monitoring and controlling the heat applied to each bond line during the bonding operation.

4. The bond fixture of claim 1, wherein said at least one fixture comprises a pair of pressure plates each positioned on opposite sides of said bond line.

5. The bond fixture of claim 4, further comprising an actuator coupled to at least one of said pair of pressure plates to provide said predetermined uniform compressive force.

6. An in-jig assembly bond fixture for manufacturing a composite gas turbine engine component having an annular outer member, an inner hub and a plurality of intermediate members attached between the outer member and the hub, comprising:
  a base member;
  a plurality of outer fixture means mounted to said base member for holding an outer end of each of the intermediate members and the outer annular member in proper position relative to one another to bond each of the intermediate members to the outer annular member, each of said outer fixture means including means for applying a first predetermined uniform compressive force to a joint between the intermediate member and the annular member during a bonding operation;

first heating means for applying heat to said joint between the intermediate member and the annular member;

a center fixture means mounted to said base member for holding an inner end of each of the intermediate members and the inner hub in proper position relative to one another to bond each of the intermediate members to the hub, said center fixture means including means for applying a second predetermined uniform compressive force to a joint between the intermediate member and the hub during the bonding operation; and second heating means for applying heat to said joint between the intermediate member and the hub.

7. The bond fixture of claim 6, wherein each of said outer fixture means comprises:
   a first pressure plate for abutting an outer surface of the annular outer member during the bonding operation;
   a backstop for abutting and retaining the intermediate member outer end; and
   a first actuator means for forcing said pressure plate against the annular outer member to cause said predetermined uniform compressive force on the joint between the annular outer member and the intermediate member during the bonding operation.

8. The bond fixture of claim 7, further comprising control means for monitoring and controlling each of the uniform compressive forces during the bonding operation.

9. The bond fixture of claim 7, wherein said pressure plate is slidably mounted to said base member and has an operating face conformable to an outer surface of the annular outer member, said pressure plate being slidable between a non-operating position without pressure being applied and an operating position with said operating face applying pressure to the annular outer member.

10. The bond fixture of claim 9, further comprising a layer of heat resistant conformable material disposed between said pressure plate and the annular outer member to facilitate conformance between said pressure plate operating face and the annular outer member to cause substantially uniform pressure across said operating face when applied to the annular outer member.

11. The bond fixture of claim 7, wherein said actuator comprises:
   a pusher bar support member slidably mounted to said base member for movement between a non-operating position and an operating position for applying said compressive force;
   a pusher bar pivotably mounted to said support member, said pusher bar having an operating end for engaging said pressure plate to cause said uniform compressive force when said support member is in its operating position;
   an expandable air bladder mounted to said base member; and
   a pin mounted at one end to said air bladder and with an opposite end for engaging and sliding said support member to its operating position when said air bladder is expanded to provide a controllable force during the bonding operation.

12. The bond fixture of claim 7, further comprising means for adjusting a position of said backstop.

13. The bond fixture of claim 7, wherein said first heating means comprises a plurality of electrical heating elements positioned at selected locations in at least one of said first pressure plate and said backstop.

14. The bond fixture of claim 6, wherein the annular outer member comprises a radially extending flange extending from one circumferential edge of the annular outer member and the intermediate member comprises a radially extending flange for residing in nested relation with the annular member flange, said bond fixture further comprising means for applying a third predetermined compressive force to a joint between the intermediate member flange and the annular member flange.

15. The bond fixture of claim 14, further comprising control means for monitoring and controlling each of the predetermined compressive forces during the bonding operation.

16. The bond fixture of claim 6, further comprising
   means for monitoring and controlling the heat applied to said joint between the intermediate member and the annular member and for monitoring and controlling the heat applied to said joint between the intermediate member and the hub.

17. The bond fixture of claim 16, wherein said monitoring and controlling means comprises a plurality of thermocouples each selectively located relative to said joint between the intermediate member and the annular member and the joint between the intermediate member and the hub.

18. The bond fixture of claim 6, wherein said center fixture means comprises:
   a cup-shaped pressure plate for abutting an inner face of the hub;
   a hub actuator means for forcing said cup-shaped pressure plate against the hub inner face;
   a plurality of second pressure plates, one each for abutting juxtaposed inner ends of two adjacent intermediate members; and
   a plurality of second actuator means, one associated with each second pressure plate for forcing said associated pressure plate against said juxtaposed inner ends, said hub actuator means and each of said plurality of second actuator means applying said second predetermined uniform compressive force to the joint between the intermediate member and the hub when said hub and said second actuator means are operated during the bonding operation.

19. The bond fixture of claim 18, wherein said second heating means comprises a plurality of electrical heating elements positioned at selected locations in at least one of said cup-shaped pressure plate and in each of said second pressure plates.

* * * * *